United States Patent [19]

Anderson et al.

[11] Patent Number: 4,797,621

[45] Date of Patent: Jan. 10, 1989

[54] LEAK DETECTOR AND LOCATOR UTILIZING TIME DOMAIN REFLECTOMETRY AND SAMPLING TECHNIQUES

[75] Inventors: Arthur L. Anderson, Kokomo, Ind.; Douglas S. Bailey, Deerfield; Richard J. Korinek, Aurora, both of Ill.

[73] Assignee: Midwesco, Inc., Niles, Ill.

[21] Appl. No.: 71,022

[22] Filed: Jul. 8, 1987

[51] Int. Cl.$^4$ ............................................. G01M 3/18
[52] U.S. Cl. .............................. 324/533; 73/40.5 R; 340/605
[58] Field of Search .......................... 324/533, 522; 73/40.5 R; 340/605

[56] References Cited

U.S. PATENT DOCUMENTS

| | | | |
|---|---|---|---|
| 3,600,674 | 8/1971 | Brea et al. | 73/40.5 R X |
| 3,781,665 | 12/1973 | Gale | 324/533 |
| 3,981,181 | 9/1976 | Ochiai | 73/40.5 R |
| 4,041,381 | 8/1977 | Hwa | 324/533 |
| 4,104,582 | 8/1978 | Lambertsen | 324/533 |
| 4,491,782 | 1/1985 | Bellis et al. | 324/533 |
| 4,499,417 | 2/1985 | Wright et al. | 324/522 X |

FOREIGN PATENT DOCUMENTS 2318424 10/1974 Fed. Rep. of Germany ...... 324/533
56-22923 3/1981 Japan ............................. 73/40.5 R

*Primary Examiner*—Stewart J. Levy
*Assistant Examiner*—Joseph W. Roskos
*Attorney, Agent, or Firm*—Mason, Kolehmainen, Rathburn & Wyss

[57] ABSTRACT

A leak detector and locator utilizes an electrical cable disposed in proximity to fluid carrying pipes or other area wherein a leak may occur. Pulses are applied to the cable and the reflected waveform is analyzed to detect changes in the characteristic impedance of the cable caused by fluid penetrating the insulation of the cable. A different portion of the waveform corresponding to a different point on the cable is sampled after each pulse is generated and stored until the entire waveform has been sampled and stored. Subsequent samples of the waveform are compared with the stored waveform and a leak is indicated if the subsequently sampled waveform differs from the stored waveform by a predetermined amount.

31 Claims, 4 Drawing Sheets

LEAK DETECTOR AND LOCATOR UTILIZING TIME DOMAIN REFLECTOMETRY AND SAMPLING TECHNIQUES

BACKGROUND OF THE INVENTION

1. Field of the Invention

This invention relates generally to time domain reflectometry systems, and more particularly to time domain reflectometry systems utilizing sampling techniques to detect leaks.

2. Description of the Prior Art

Various leak detection systems employing reflectometry techniques are known. In one such system, a pulse is sent down a transmission line placed in proximity to a pipe being monitored. Reflections of the pulses are monitored, and threshold values are established above and below the reflected waveforms. Upon the occurrence of a leak or break in the pipe, or a break in the cable, the characteristic impedance of the line changes, thus resulting in a change in the waveform of the reflection. If the change in impedance is sufficient to cause the waveform to cross either the upper or lower threshold, a leak or break is indicated.

Other systems for detecting leaks or analyzing transmission lines for the location of mismatches are also known. Typical examples of such systems are shown in U.S. Pat. Nos. 3,600,674, 3,981,181, 4,095,174, 4,491,782, 4,538,103 and 4,630,228. The above-mentioned patents disclose various ways of detecting leaks or impedance changes in cables using various analog and digital techniques. These systems include analog systems that compare an analog reflected waveform with predetermined thresholds, systems that utilize radar techniques, systems that detect changes in the distributed capacitance in a plurality of cables scanned in sequence, systems that digitize the waveform and compare the digitized waveform with a predetermined threshold, and systems that Fourier analyze the reflected waveform.

While these systems do provide a way to detect leaks or transmission line discontinuities, the analog systems are subject to drift. In addition, systems utilizing fixed thresholds to generate an alarm necessarily require a compromise between sensitivity and the ability to accommodate cable having a nonuniform characteristic impedance over their length. Also, many of the prior art systems are capable of only detecting a single leak in the system, i.e., they are capable of detecting the closest leak, but are not able to "see through" the closest leak to determine the existence of leaks farther down the line. In addition, many of the prior art systems require the use of complex and expensive high speed or high frequency circuitry to achieve the desired function.

SUMMARY OF THE INVENTION

Accordingly, it is an object of the present invention to provide a system for detecting electrical nonuniformities that overcomes many of the disadvantages of the prior art systems.

It is another object of the present invention to provide a leak detector and locator that overcomes many of the disadvantages of the prior art systems.

It is another object of the present invention to provide a system for detecting leaks or electrical discontinuities utilizing time domain reflectometry and digital sampling techniques.

It is another object of the present invention to provide a leak detector system for a piping system that is adaptable to different conditions existing in the piping system.

It is yet another object of the present invention to provide a leak detector for a piping system that can detect and locate more than one leak simultaneously.

It is another object of the present invention to provide a system that detects the position of a leak or electrical discontinuity with high accuracy without the need for high speed circuitry.

In accordance with a preferred embodiment of the invention, when the system is used as a leak detector, a cable, preferably a coaxial cable having insulation capable of absorbing or otherwise receiving water or other fluid, is placed in the area being monitored, for example, in proximity to pipes in a piping system being monitored. The insulation of the cable should have the characteristic that the fluid being monitored can enter the space between the conductors of the cable and thereby change the characteristic impedance of the cable in the event of a leak. Thus, porous insulation or any insulation, including air, that contains voids that may be entered by the fluid being monitored may be used. A pulse generator is employed to send pulses down the cable and the waveforms of the reflections of the pulses are analyzed. Any leak from within or without the piping system enters the insulation of the cable and causes a change in impedance in that portion of the cable, thus resulting in a change in the waveform of the reflected pulse. By noting the position of the change in shape of the waveform, the location and other characteristics of the leak may be determined.

In accordance with an important aspect of the invention, the waveform is analyzed utilizing sampling techniques. First, a reference waveform is generated by sending a pulse down the cable and sampling, digitizing and storing a portion of the reflected waveform corresponding to a particular position on the cable, for example, a close in position. Subsequently, a second pulse is sent down the cable and a different portion of the reflected waveform is sampled, digitized and stored. For example, the latter portion of the waveform may correspond to a different position on the cable, for example, a point farther out on the cable. The process is repeated until a representation of the characteristic impedance along the entire length of the cable has been obtained. This representation is then used as a standard that is compared with subsequently obtained waveforms and if any portion of the waveform deviates from the standard waveform by a predetermined amount, an alarm is generated. Once the alarm is acknowledged, the new waveform may be used as the standard, if desired, to detect additional leaks.

DESCRIPTION OF THE DRAWING

These and other objects and advantages of the present invention will become readily apparent upon consideration of the following detailed description and attached drawing wherein.

DETAILED DESCRIPTION OF THE PREFERRED EMBODIMENT

Figure 1:
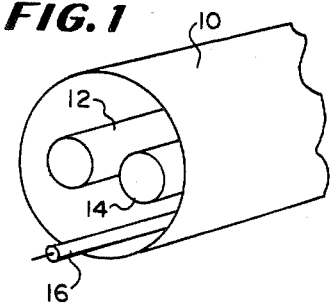
FIG. 1 is a sectional perspective view of a piping system protected by the system according to the present invention and shows a leak detecting coaxial cable disposed within the piping system.
Figure 2:
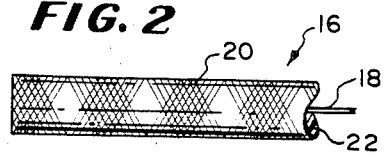
FIG. 2 is a view showing the leak detecting cable of FIG. 1 in greater detail.

Referring to the drawing, with particular attention to FIG. 1, there is shown a portion of a piping system suitable to be protected by the leak detector according to the invention. The portion of the piping system as illustrated in FIG. 1 includes an outer pipe 10 surrounding a pair of inner pipes 12 and 14. Typically, in such an arrangement, the pipes 12 and 14 may carry various types of fluids ranging from water or steam to various toxic chemicals. The outer pipe 10 serves as a protective shield for the pipes 12 and 14 to protect the pipes 12 and 14 from the environment and to catch any spills that may occur in the event of any damage to the pipes 12 and 14.

In order to determine whether there has been damage to any of pipes 10, 12 and 14, a sensing cable 16 is disposed inside the pipe 10. Thus, the cable 16 is able to sense any leakage from the pipes 12 and 14, as well as leakage from the environment in the event of damage to the outer pipe 10.

In the embodiment illustrated in FIG. 1, the cable 16 includes a central conductor 18 and an outer braided shield 20. There is no protective covering disposed over the braided shield 20 in order to permit fluid to flow between the wires forming the shield 20 and permeate the insulation 22; however, if desired, a fluid permeable covering may be placed over the braided shield 20. Preferably, the insulation 22 is porous and has a plurality of voids into which any spillage from the piping system may flow. The insulation 22 may be fabricated from any suitable material having voids capable of receiving the spilled fluid, such as, for example, fiberglass or various plastics, and is selected to provide a detectable change in the characteristic impedance of the line 16 when the insulation 22 is moistened. Preferably, the insulation 22 should also have good drying characteristics so that the characteristic impedance of the line 16 returns to normal shortly after the leak has been repaired.

Figure 3:
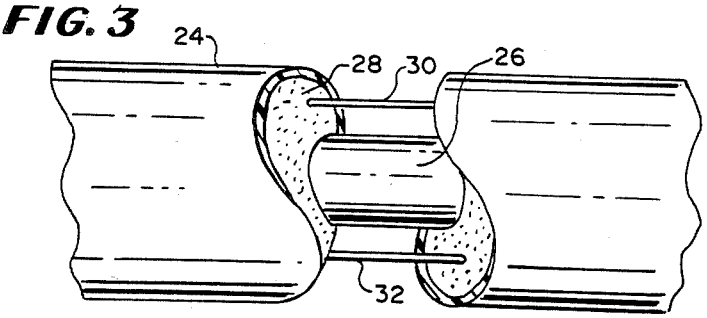
FIG. 3 is a sectional perspective view of a piping system utilizing an alternative embodiment of leak detecting cable.

FIG. 3 illustrates another embodiment of a piping system utilizing an outer protective pipe 24 that surrounds an inner pipe 26 that may be, for example, a steam pipe. A layer of insulation 28, which may be, for example, a urethane foam insulation fills the space between the outer pipe 24 and the inner pipe 26.

In a piping system such as the one illustrated in FIG. 3, rather than utilizing a coaxial cable, it may be desirable to utilize one or more conductors such as conductors 30 and 32 that are embedded in the insulation layer 30 in spaced relationship with the inner pipe 26. Each of the conductors 30 and 32 can form a transmission line in conjunction with the pipe 26, if the pipe 26 is conductive. The insulating material 28 serves as the dielectric between the pipe 26 and the conductors 30 and 32, and in the event of a leak, fluid absorbed by the insulation 28 changes the characteristic impedance of the transmission lines thus formed to provide an indication of the leak. The arrangement illustrated utilizes two diametrically opposed conductors 30 and 32 so that one of the conductors will generally be at or below the level of the pipe 26 so that any fluid flowing from the pipe 26 will flow downwardly onto one of the conductors. Thus, orientation of the piping system is not critical. Alternatively, in the event that it is desirable to make the pipe 36 of a nonconductive material, the conductors 30 and 32, in conjunction with the foam insulation 28 can be used to form the leak detecting transmission line.

Figure 4:
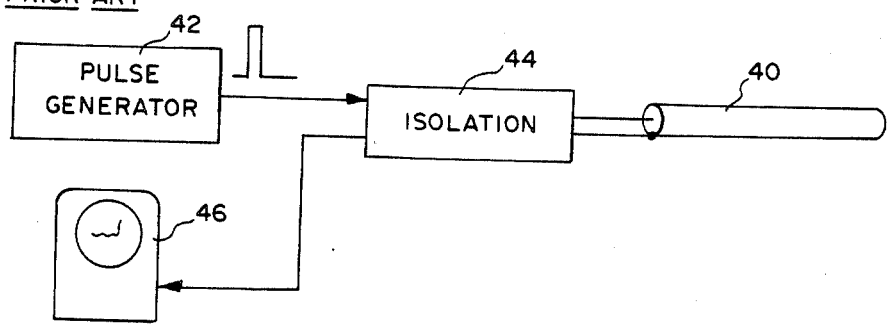
FIG. 4 is a block diagram of a prior art leak detecting system.

Referring to FIG. 4, leak detectors according to the prior art have utilized transmission lines such as a transmission line 40 for the purposes of leak detection. The transmission line 40 may take the form of any suitable transmission line whose characteristic impedance changes when being exposed to moisture and may take various forms including a coaxial cable such as the coaxial cable 16 or individual conductors such as the conductors 30 and 32, among other configurations. A pulse generator such as pulse generator 42 is coupled to the detecting cable 40 by means of a suitable isolation circuit such as the isolation circuit 44. The isolation circuit 44 may be a passive circuit, or may be an active switching circuit that directs the pulse from the pulse generator 42 to the cable 40 when the pulse is present and directs any reflected wave from the cable 40 to an analyzing device such as, for example, an oscilloscope 46, as illustrated in FIG. 4.

Figure 5:
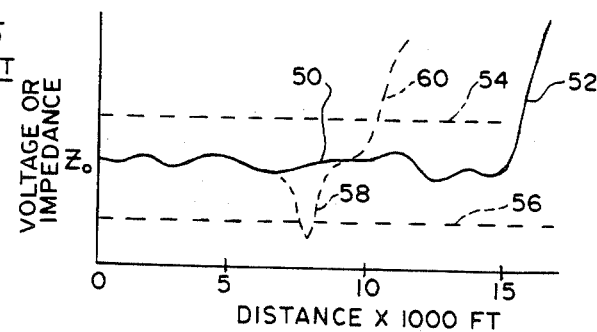
FIG. 5 illustrates the reflected waveform and fixed thresholds of a typical prior art system.

As the pulse propagates down the line 40, the voltage across the cable will be proportional to the characteristic impedance of the cable. Immediately after the pulse has been applied to the cable, there will be no signal present at the input to the cable until a reflected waveform is received. If the characteristic impedance of the cable is uniform and matched to the impedance of the pulse generator, there will be no reflected wave received until the pulse propagates along the entire length of the cable and is reflected by the end of the cable which is normally open circuited. However, because cables generally do not have a constant characteristic impedance that is perfectly matched to the impedance of the pulse generator 42, reflections will occur when the pulse encounters such irregularities in impedance. The reflected waveform across the input to the cable will be similar to the waveform illustrated in FIG. 5, which is illustrative of the type of waveform that would be displayed on the oscilloscope 46. Although the waveform displayed on the oscilloscope 46 is a voltage waveform representative of the voltage at the input to the cable 40 following the generation of a pulse, the vertical axis of the display may be calibrated in units of impedance to relate the waveform to the characteristic impedance of the line, as is illustrated in FIG. 5. The horizontal axis may be calibrated in time, or more conveniently in terms of cable length or distance as is illustrated in FIG. 5.

Referring now to FIG. 5, the waveform has an essentially horizontal portion 50 and an upwardly (or downwardly) extending portion 52. The essentially horizontal portion 50 is the result of reflections within the cable 40, and is a function of the characteristic impedance along the length of the cable. Thus, the amplitude of the reflected waveform will vary as the characteristic impedance of the cable varies. The upwardly extending portion of the waveform 52 is the result of the pulse being reflected from the open circuited end of the cable 40. If desired, the far end of the cable 40 could be short circuited, thus resulting in a downwardly extending end reflection, or otherwise terminated.

In systems according to the prior art, the horizontal portion 50 of the waveform is bounded by a pair of thresholds 54 and 56. The thresholds 54 and 56 are separated from the horizontal portion of the waveform by an amount sufficient to accommodate variations in the amplitude of the horizontal portion 50 of the waveform caused by variations in the characteristic impedance of the cable. Thus, under normal circumstances, in the absence of a leak, the horizontal portion 50 of the waveform would be bounded by the thresholds 54 and 56 as illustrated in FIG. 5.

If a leak occurs in the system, the characteristic impedance of the transmission line 40 will change as the fluid from the leak permeates the insulation of the cable and changes the dielectric constant of the insulation, thus changing the characteristic impedance of the cable. In most instances, this change is a decrease in characteristic impedance that occurs in proximity to the leak, and results in a dip, such as the dip 58, in the horizontal portion 50 of the waveform. If the dip 58 is of sufficient magnitude to cross the threshold 56, an alarm indicating a leak is sounded, and the approximate position of the leak is ascertained from the position of the dip 58. Similarly, in the event of a break in the cable, a new end echo 60 resulting from the reflection at the break in the cable occurs. If this end echo is of sufficient magnitude to cross the threshold 54, an alarm is also sounded.

Unfortunately, in a system such as the system illustrated in FIG. 5, the thresholds 54 and 56 must be spaced sufficiently apart to accommodate variations in the characteristic impedance of the cable. Consequently, small leaks that result in small changes in characteristic impedance that produce a change in the shape of the waveform of the order of magnitude of expected variations in the characteristic impedance of the cable are not detected. Moreover, once an alarm condition has been sounded, additional leaks are not detected.

Figure 6:
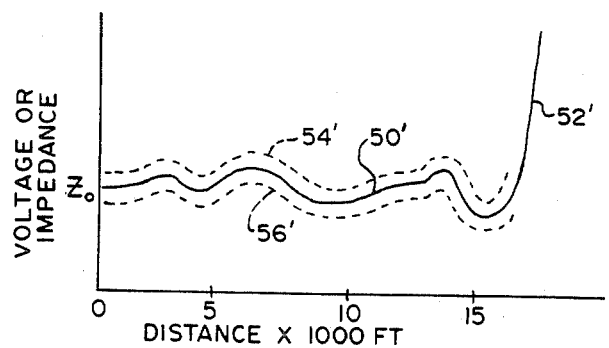
FIG. 6 illustrates the respective waveform and adaptive thresholds generated by the system according to the invention.

Thus, in accordance with an important aspect of the present invention, the reflected waveform, for example, the waveform consisting of a horizontal portion 50' and the vertical portion 52' is digitized and stored in a memory. Once this has been done, a pair of thresholds disposed, for example, a predetermined distance above and below the horizontal portion 50' of the waveform may be defined. Such thresholds are illustrated by the dashed lines 54' and 56' in FIG. 6. By employing thresholds that vary with distance along the cable based on the characteristic impedance of the cable as a function of distance, the entire expected variation in characteristic impedance of the cable along its length need not be accommodated. Thus, the thresholds may be placed closer to the horizontal portion 50' of the waveform, thus resulting in a more sensitive system. These thresholds may be placed a constant distance above and below the horizontal portion 50', or they may be brought closer to the horizontal portion 50' at more distant portions of the cable to compensate for cable attenuation. Also, as discussed in a subsequent portion of the specification, wider pulses may be used when sampling more distant portions of the cable to compensate for attenuation. Also, in the event of a leak, the post leak waveform can be digitized and stored, and new thresholds accommodating the post leak waveform can be defined. Such post leak thresholds would define a new "normal" waveform and any deviation from the post leak waveform caused by a subsequent leak or by a high volume leak would trigger another alarm condition.

In order for a system to be useful for leak detection, it is desirable to be able to determine the location of the leak within an accuracy of approximately five feet. Using conventional real time digitizing techniques, this would require that the reflected waveform be sampled at a rate of one sample every 15 to 20 nanoseconds, with a 20 nanosecond sampling rate providing an accuracy of approximately five feet. While such a high speed sampling rate is achievable, sampling at such a high rate requires expensive high speed sampling and digitizing circuitry. Thus, in accordance with another important aspect of the invention, the need for such expensive high speed circuitry is eliminated by not doing the sampling in real time, but rather by utilizing sampling techniques wherein only a single sample is taken following the generation of each pulse. This is accomplished by the circuitry illustrated in FIG. 7. In the circuitry illustrated in FIG. 7, a pulse generator 142 generates a plurality of pulses that are applied to a transmission line 140 similar to the line 40 via an isolation network 144 similar to the isolation network 44. A variable window sampler 160 samples one portion of the reflected waveform following the generation of each pulse by the pulse generator 142. A digitizer 162 digitizes each sample from the variable window sampler 160 and applies the digitized sample to a processer and memory 164. The processer and memory 164 reconstructs the waveform from the digitized samples from the digitizer 162 and generates the appropriate thresholds about the reconstructed waveform. Should a leak occur, and the waveform exceed the threshold, the processer and memory 164 would signal an alarm and display to indicate the occurrence and location of a leak.

Figure 8:
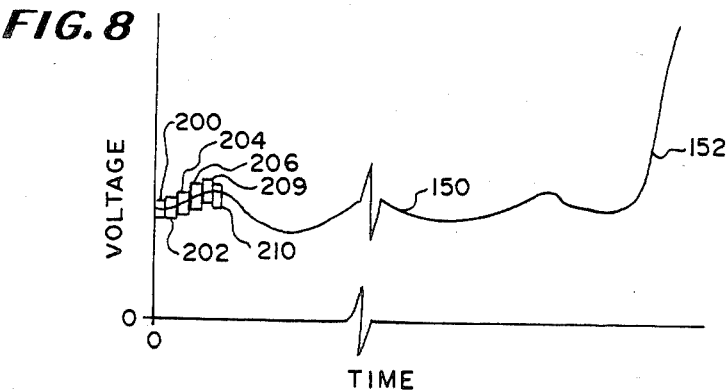
FIG. 8 is a graph illustrating how the reflected waveform is sampled and stored by the system according to the invention.

The manner in which the waveform is reconstructed is illustrated in FIG. 8. Following the generation of the first pulse, the horizontal portion 150 of the waveform is sampled over a narrow time window 200 having a duration of, for example, 10 nanoseconds immediately following the generation of the pulse as sampled and digitized. Following the generation of the next pulse, which can occur on the order of one millisecond later, another sample is taken in another sampling window 202 which is displaced in time relative to the sampling window 200 so that it occurs at some time $\Delta t$, for example, 14 nanoseconds later after the generation of the pulse than did the sampling window 200. Subsequent sampling windows, 204, 206, 208 and 210 are then defined. Each of the sampling windows 204, 206, 208 and 210 would also be displaced $\Delta t$ in real time relative to the generation of a pulse. Thus, following each pulse, a single sample is taken and digitized. The sample following each pulse would be displaced in time by a predetermined amount, $\Delta t$, for example, 14 nanoseconds, and a single sample would be taken following the generation of each pulse until the waveform of the entire line is mapped.

Mathematically, this can be expressed in real time by the equation $$t_{n+1} = t_n + t_p + \Delta t,$$

where $t_n$ is the time of occurrence of the nth sample, $t_{n+1}$ is the time of occurrence of the (n+1)th sample, $t_p$ is the time interval between successive pulses, and $\Delta t$ is the incremental offset. Thus, for example, if the pulses were generated at one millisecond intervals, the first sample would be taken some time T following the occurrence of the first pulse. The next sample would be taken one millisecond plus 14 nanoseconds later. The following sample would be taken at T plus 2 milliseconds and 28 nanoseconds, etc.

If desired, more than one sample can be taken following the generation of a pulse. For example, two samples can be taken following each pulse. Initially, the samples of the reflected waveform can be taken, for example, at portions of the waveform corresponding to the beginning and the center of the cable. Following subsequent pulses, the sampling time can be shifted so that the samples are incrementally shifted to portions of the waveform that correspond to portions of the cable that are farther down the line. The process can be continued until the near half of the cable is mapped by the first samples following each of the pulses and the distant half of the cable is mapped by the second samples following each of the pulses.

More generally, if M samples are taken following the generation of each pulse, they will correspond to samples along the line that are spaced apart by a distance equal to 1/M times the length of the line. Alternatively, the line may be mapped in sections, for example, P sections. In this instance the spacing would be equal to 1/MP times the length of the line. This would permit close in sections of the line to be mapped with different techniques than the more distant sections to compensate for line attenuation. For example, as described below, narrow pulses can be used to map the close sections of the cable and wider pulses used to map the distant in sections. For example, if the cable were mapped in four sections (P=4), four different pulse widths could be used to compensate for cable attenuation.

Multiple sampling reduces the amount of time required to map a cable, and as stated two or more samples per pulse can be taken; however, the number of samples per pulse that can be taken is constrained by the speed of the circuitry being used for the reasons stated in the discussion of the systems that map the entire cable utilizing real time sampling following each pulse. However, for a cable requiring N samples to map its length, as long as M (or the product MP for cables mapped in sections) is substantially smaller than N, no problems should be encountered.

The width of the pulses produced by the pulse generator 142 may be constant, for example, a nominal pulse width a one microsecond, although the nominal pulse may range from a few nanoseconds to 4 microseconds. Generally, the width of the pulses is based on the expected cable attenuation, with the shorter pulse widths being used for relatively short cables and the longer pulse widths being used to compensate for the increased attenuation of long cables and to permit the system to "see" through a leak. Thus, whenever high attenuation is expected, a wider pulse is used to provide sufficient power to permit the reflected waveform to be detected.

Because reflections that occur from close irregularities on the cable do not travel as far as reflections from irregularities that are present farther down the cable, the reflections from the close irregularities do not experience as much attenuation as reflections from irregularities a long way down the line. The non-uniform attenuation causes a distortion in the amplitude of the reflected waveform. Such distortions have in the past been compensated by varying the gain of the receiver of that receives the reflected pulse as a function of time so that the gain is reduced for reflected signals that are reflected from close irregularities and increased for signals that are reflected from irregularities a greater distance away. However, even in such systems, it may be difficult to detect a highly attenuated reflection from a distant point on the cable because of the presence of ambient noise.

Thus, in accordance with another important aspect of the present invention, the widths of the pulses generated by the pulse generator 142 are varied, so that when a sample that corresponds to a portion of the reflected waveform that was reflected from a close in irregularity is to be taken, a narrow pulse is sent down the line, while if the portion of the reflected waveform corresponding to a more distant irregularity is to be sampled, the width of the pulse is increased. For example, when the initial portion of the reflected waveform is being digitized, the width of the pulse may be on the order of 14 nanoseconds. This pulse width may be employed to digitize reflections from the first section of the cable, for example, the first 250 feet. After the first 250 feet, the width of the pulse may be increased by a predetermined amount, for example, by 14 nanoseconds to provide a pulse width of 28 nanoseconds for approximately the next 48 pulses. The next 48 pulses correspond to approximately the next 250 feet of cable. After the generation of these 48 pulses, the pulse width is again increased for the next 48 pulses. The process is repeated with the pulses being widened until the waveform for entire cable is digitized. The amount of widening of the pulse and how often such widening occurs may be determined based on published specifications of the cable, or empirically based on the characteristics of the cable being used and whether or not the cable is wet.

The system according to the present invention is also capable of providing an indication of how much of the cable is wet. Such a determination is sometimes difficult to make because changes in the shape of the reflected waveform caused by a leak may be subtle and it may be difficult to determine the extent of the leak by simply observing the waveform. However, the speed of propagation of a signal through a cable is inversely proportional to the dielectric constant of the insulation in the cable. As a result, the signal pulse as well as the reflected signal will travel more slowly through a wet cable than through a dry cable. Thus, the amount of time required for a pulse to propagate to the end of the cable and back is affected by the amount of cable that is wet. This results in a change in the position of the end echo or the vertical portion 52' or 152 of the waveform. Because the end echo is a very prominent feature of the reflected waveform, any lateral shift in the end echo resulting in a change in propagation time through the cable can be detected and used to provide an indication of the amount of cable that is wet.

The system according to the present invention also has the advantage of being able to indicate the direction of propagation of the leak, that is, whether the leak is traveling toward or away from the monitoring station. This function is readily achieved by digitizing the reflected waveform at predetermined intervals and comparing the waveforms to determine the direction of the leak.

Figure 9:
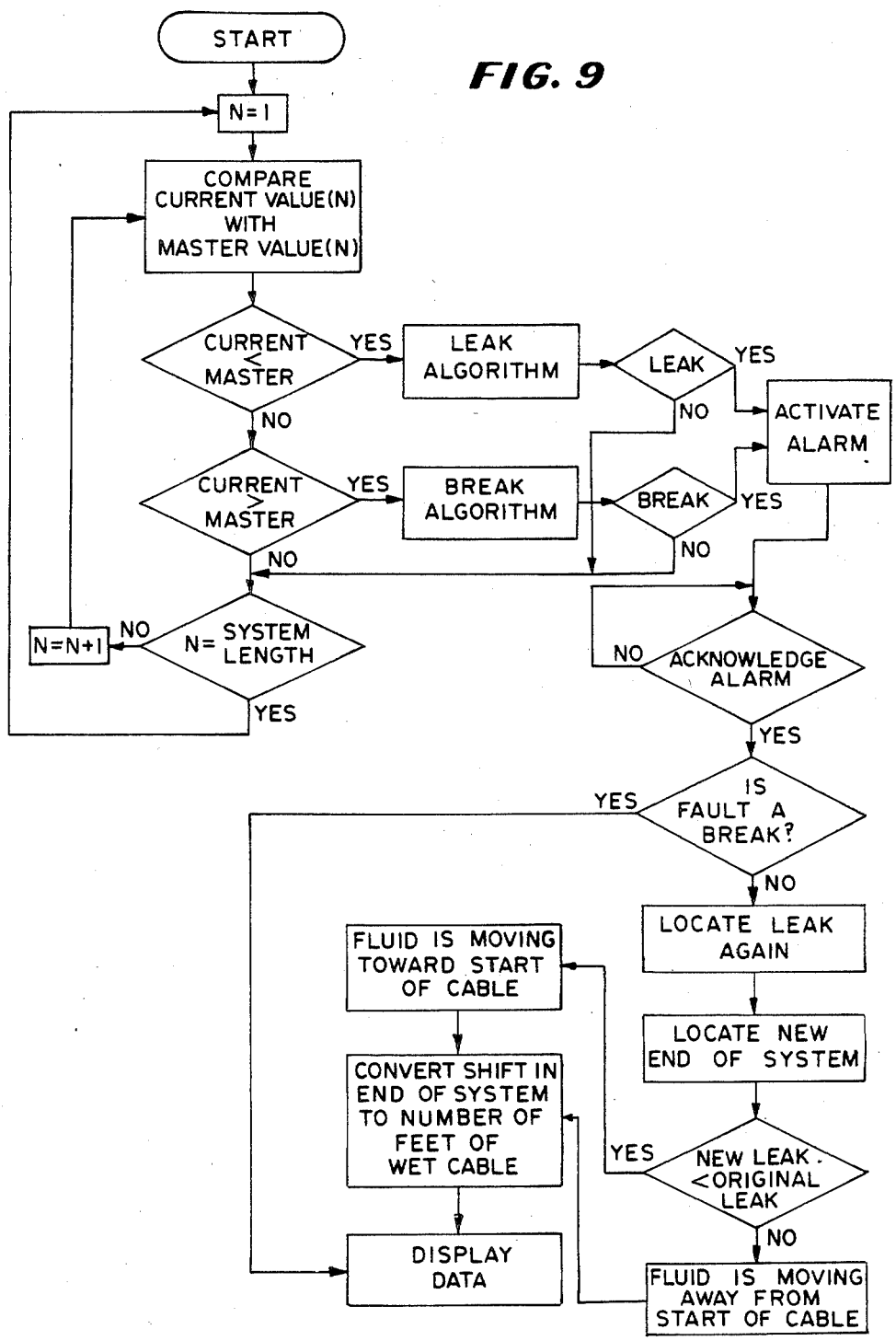
FIG. 9 is a logical flow chart illustrating the logic employed in determining the location and direction of travel of a leak.

Referring now to FIG. 9, the leak location routine is initiated by a start routine which initiates a mapping of the reflected waveform to determine whether a leak or break has occurred. The start routine initializes the pulse count counter to a value of 1. The current value of the count in the pulse count counter is compared with a master value, N, which is a function of the length of the line. For example, assuming that a pulse travels approximately five feet in approximately 20 nanoseconds, and a five foot resolution was desired, approximately 500 pulses would be required to map the reflected waveform of a cable 2,500 feet long. Thus, in the aforementioned example, N would be set to 500 for a 2,500 foot long cable, but other values of N could be used depending on the length of the cable. Thus, assuming a 2,500 foot long cable, the master value of N, illustrated in FIG. 9, would be 500.

Figure 10:
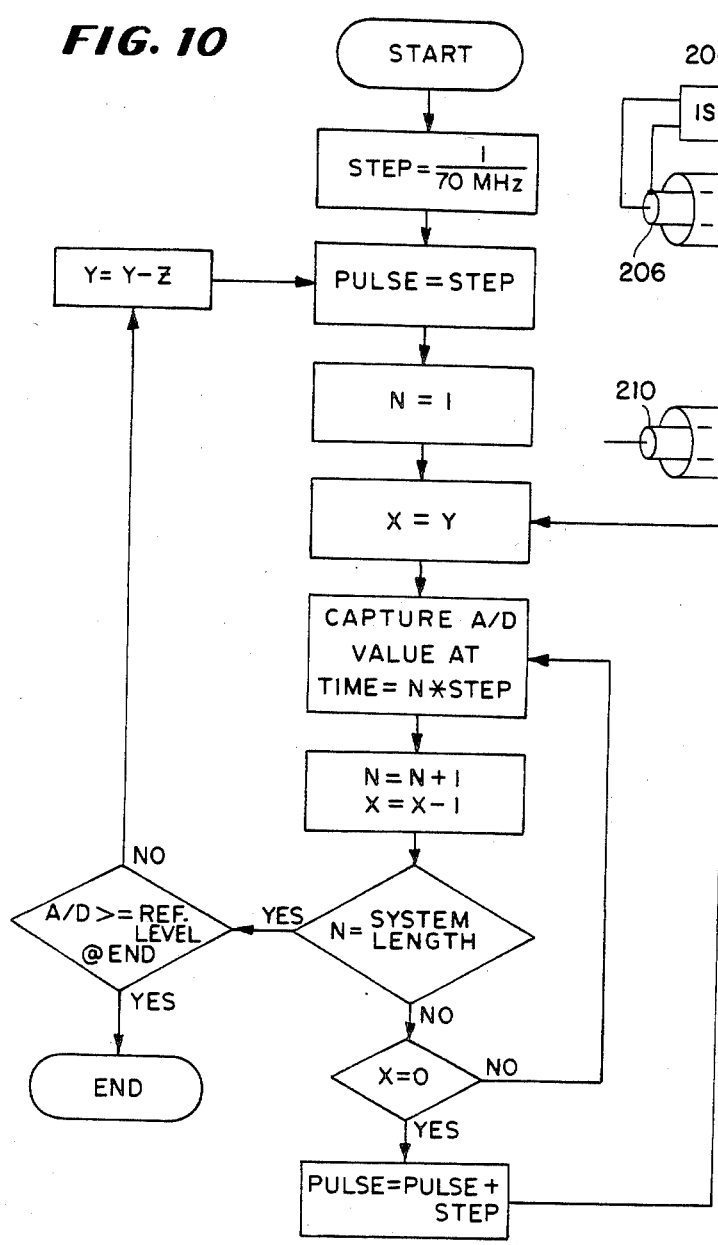
FIG. 10 is a logical flow chart illustrating the methodology of adjusting the width of the pulses sent down the line to compensate for line attenuation.

The first pulse (or subsequently the nth pulse) would be sent down the line and the current value of the reflected waveform corresponding to the number of the pulse sent down the line would be compared with a master value of the corresponding pulse stored in the memory. The stored master values were previously obtained by mapping the reflected waveform when the line was known to be dry, for example, by sending N pulses down the line and digitizing and storing the portion of the reflected waveform corresponding to each of the pulses. If desired, the line can be mapped several times, and the average of the several samples can be stored. Also, extraneous points could be discarded. One mapping routine is illustrated in FIG. 10, and described in a following portion of the specification referring to FIG. 10.

If the current value of the sampled, reflected pulse resulting from the first pulse sent down the line were less than the previously stored value for the corresponding pulse, a leak algorithm would be initiated. The leak algorithm would compare the current versus the stored value of the corresponding sample to determine whether that particular sample sufficiently deviates from the corresponding stored sample, for example, whether the lower threshold were penetrated. In addition, the leak algorithm may compare the average of a predetermined number of samples with the corresponding stored sample to determine whether the average is below the corresponding stored by a predetermined amount, e.g., below the threshold. Also, successive samples could be compared with corresponding stored values to indicate a leak if a predetermined number of successive samples are below the corresponding stored values.

If neither the amount of deviation nor the predetermined number of samples that deviate from the stored value exceed a predetermined level, no leak is indicated. The number of the sample, N, is then compared with the total number of samples in the system to determine whether the entire cable has been evaluated. If N is less than the system length, the value of N is incremented by 1 and the comparison with the stored value with the next value N, as well as the leak and break algorithms, are repeated. As long as there is no leak or break indicated by the leak or break algorithm, the value of N is incremented until the value of N equals the system length and the value of N is reset to 1 until the next mapping cycle is initiated.

If the current value of the sampled reflected pulse is not less than the previously stored value for the corresponding pulse, a determination is made as to whether the current sample is greater than the stored master. If not, the number of the sample, N, would be compared with the total number of samples as previously described. If the value of the current sample is greater than the master, then the break algorithm is called. The break algorithm may be similar to the leak algorithm except that the comparison is made as to whether the present value of the sample is greater than the stored value by a predetermined amount (upper threshold) and the degree of deviation in the number of samples deviating from the stored value are considered in order to determine whether there is a break. If there is insufficient deviation or a sufficient number of samples do not deviate from the corresponding stored values by the predetermined amount, no break is indicated. If no break is indicated, the previously described length comparison is made.

In the event that a leak or a break is indicated by either the leak or break algorithm, an alarm is activated. The alarm continues until it is acknowledged. Generally, the acknowledgement is done manually by an operator who is monitoring the system, for example, via a keyboard entry. Upon the receipt of an acknowledgement, a determination is made as to whether the fault is a break or a leak. If it is a break, data defining the location of the break is displayed. If the fault is a leak, the current reflected waveform is stored and the line is again mapped as previously described in order to ascertain whether there are any changes between the latest waveform and the waveform that resulted in the alarm being generated. Upon the mapping of the subsequent waveform, the location of the leak, as well as the end echo is determined. If the new portion of the leak is closer to the pulse producing station than was the original leak, the leak is moving toward the pulse applying end of the cable. If the indication of the new leak is not closer, then the fluid is moving away from the pulse producing end of the cable. Thus, the system is able to provide an indication of the direction of flow of the leak. Also, the position of the end echo of the waveform is compared with the position of the original end echo to determine the number of feet of cable that are wet. This may be accomplished because the speed of propagation through the cable is dependent upon the dielectric constant of the air or other fluid within the cable, with the speed of propagation being inversely proportional to the dielectric constant. Thus, knowing the dielectric constant of the fluid within the cable and knowing the increase in propagation time, the length of cable that is wet can be readily calculated.

Referring now to FIG. 10, the flow chart illustrated therein shows how the width of the pulses is altered as a function of how far down the cable the sample is being monitored. Initially, upon the initiation of a reflected waveform mapping, a pulse defined as STEP is generated. For example, for a system having a clock frequency of 70 mHz, STEP may be on the order of 14 nanoseconds. The first pulse that is generated has a pulse width equal to STEP, and after the generation of the first pulse, N, as described in conjunction with FIG.

9, is set to 1. A variable, X, is set equal to a fixed reference number, Y, and entered into a counter. The value Y is determined by the parameters of the cable and determines the number of pulses that are generated before the pulse is increased. After X is set equal to Y, the output of the analog-to-digital converter (e.g., digitizer 162) is captured and stored after each pulse. N is then set equal to N+1 and the value of X in the counter is decremented by 1. The value of N is checked to determine whether the end of the system has been reached, and if not, the value of X is checked. As long as X is not equal to 0, the process is repeated with the output of the analog-to-digital converter being captured and stored following the generation of each pulse until the value of X in the counter is decremented to 0. When this occurs, the value of the pulse is increased by STEP, e.g. 14 nanoseconds in the example illustrated, and the process is repeated again until the value of X is again decremented to 0 at which point the pulse width is again increased and the process repeated, with the pulse width being increased by STEP every Y pulses until N equals the system length. Once N is equal to the system length, the output of the analog-to-digital converter should be sampling the end echo. If the amplitude of the end echo exceeds a predetermined reference level, this indicates that the waveform has been adequately mapped and the routine is ended until the next mapping occurs. However, in the event of high cable attentuation, which may occur as the result of, for example, leaks in the pipe, the end echo may be sufficiently attenuated such that it does not exceed the reference level.

Thus, in accordance with another important aspect of the invention, the system is designed to compensate for increased attentuation in the cable that may result from leaks or the like, thus giving the system an ability to "see through" such leaks. In order to accomplish such a compensation, in the event that the output of the analog-to-digital converter does not exceed the predetermined reference level, the value of the reference Y is decreased by a predetermined amount Z. Thus, the number of pulses that are generated before the pulse width is increased is reduced by the number Z, for example, from 48 pulses to 48−Z pulses. The mapping process is repeated as previously described with the new value of Y being equal to Y−Z so that the pulse width is increased more frequently to providewider pulses to the more distant regions of the cable than have previously been provided to accommodate the increased attenuation. Once the number of pulses has become equal to the system length, a comparison is again made with output of the analog-to-digital converter representing the end echo to determine if the end echo is of sufficient amplitude. If so, the waveform is mapped, but if not, Y is decremented by another increment of Z and the process is repeated until an end echo of sufficient amplitude is achieved.

In addition to the advantages of the present invention described above, the present invention may be used to differentiate between various fluids if the dielectric constants of the fluids are sufficiently different. For example, in a system carrying both water and a hydrocarbon such as gasoline or kerosene, it is possible to determine which of the fluids is leaking. In the example given, the slope of the reflection caused by a water leak would be steeper than the slope caused by a hydrocarbon leak because the dielectric constant of water is substantially higher than the dielectric constant of the hydrocarbon. Thus, the impedance change caused by a water leak would be greater than the impedance change caused by a hydrocarbon leak, and consequently, would result in a reflection having a greater slope.

In addition, the present invention solves another problem. In many instances, for example, in cases where it is desired to monitor two pipes in close proximity to each other, it would be convenient to be able to monitor both pipes with a single monitoring system to avoid the need for two separate systems. However, in order to do this, it is necessary to transfer the pulses from one system to another. However, attempts to achieve this transfer have heretofore been mostly unsuccessful. For example, if a coaxial cable is used to connect the leak detecting cable of one pipe line to the leak detecting cable of another pipe line, the mis-match often occurs at the interface between the leak detecting cables and the coaxial interconnecting cable results in a reflection whose amplitude was of sufficient magnitude to indicate either a break or a leak.

Figure 7:
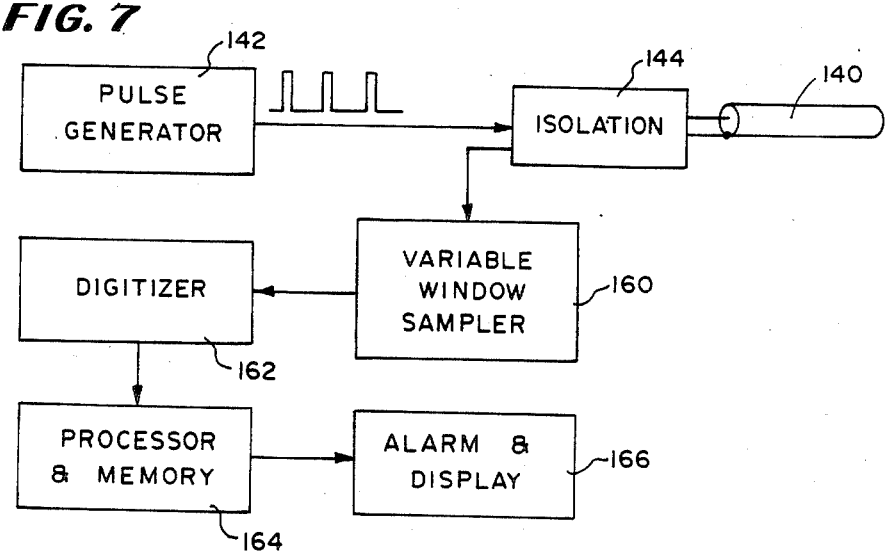
FIG. 7 is a simplified block diagram illustrating the operation of the system according to the invention.
Figure 11:
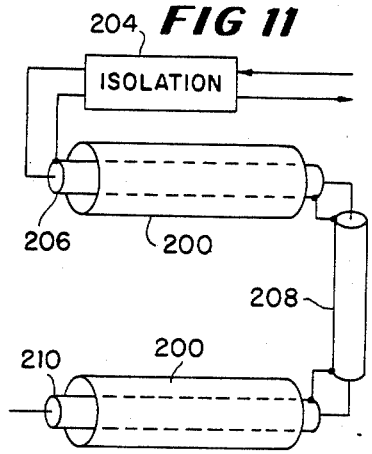
FIG. 11 illustrates an embodiment of the invention useful for detecting leaks in two spaced areas.

In some instances, it is desirable to monitor leaks in two or more areas that are relatively closely spaced, for example, in a pair of pipes such as pipes 200 and 202 illustrated in FIG. 11. This can be accomplished by utilizing separate, independent systems, such as those shown in FIG. 7, to monitor each of the pipes 200 and 202, or by utilizing a single system. When a single system is utilized, an isolation circuit 204 such as the isolation circuit 144 of FIG. 7 is utilized to apply pulses from a pulse generator, such as the pulse generator 142, to a cable 206, and to receive reflections from the cable 206 and to apply them to a variable window sampler such as the sampler 160 of FIG. 7 for processing by the system according to the invention. An interconnecting cable 208, which may be a standard coaxial cable such as, for example, a 50 ohm RG 58/U cable, is connected to the leak sensing cable 206 within the pipe 200, and serves to apply pulses from the cable 206 to a second leak sensing cable 210 in the pipe 204. Thus, a single monitoring system may be used to monitor both of the pipe 200 and 202 because a leak occurring in either the pipe 200 or 202 will enter the corresponding leak sensing cable 206 and 210 and cause a reflection that can be detected by the monitoring system according to the invention.

Prior art system of the type employing a fixed threshold, i.e., a threshold that does not follow the contours of the mapped reference reflection waveform, were not suitable for monitoring more than one area, and in most instances, could not be used to monitor two pipes in the manner illustrated in FIG. 11. The reason for this is that the characteristic impedance of the leak sensing cable may not be exactly the same as the characteristic impedance of a standard coaxial cable such as the cable 208. The difference in impedance results in an impedance mis-match at the junction of the first leak sensing cable 206 and the interconnecting cable 208 and also at the junction of the interconnecting cable 208 and the second leak sensing cable 210. These mis-matches may be sufficient to cause reflections that are on the order of magnitude of the reflections caused by a leak. Also, the physical discontinuity caused by the mechanical interconnection between the interconnecting cable and the two leak sensing cables, also increases the degree is mis-match and the amplitude of the reflections caused by the interconnections to the point that the reflections often exceed the thresholds of a fixed threshold system and cause the system falsely to indicate a break or a leak. Separating the thresholds to the point where the reflections from the junctions of the interconnecting cable do not indicate a break or a leak in many instances would make the system also be insensitive to actual leaks. To avoid the reflections caused by the interconnections of several cables, it is possible to use a single leak sensing cable that extends through the first pipe and into and through the second pipe. However, such a system can sense moisture and leaks in the area between the pipes, and such a leak between the pipes can cause a false alarm when, in fact, the pipes themselves are intact. To moisture-proof the portion of the cable between the pipes requires additional expense, and may not always be practical.

The system according to the invention has the advantage that it is able to accommodate a multiple area sensing system such as the one shown in FIG. 11, because any reflections that occur at the junctions of the interconnecting cable and the leak sensing cables are mapped and stored during the mapping and storing of the master. The system can then be programmed to ignore those reflections by defining the thresholds such that they follow the waveform caused by the reflections at the junctions, or can be made to ignore the reflections by monitoring only the samples of the reflected waveform that correspond to the leak sensing cables 206 and 210, and not considering other portions of the reflected waveform.

Obviously, many modifications and variations of the present invention are possible in light of the above teachings. While the invention has been described in conjunction with a piping system, it may be used wherever it is necessary to detect the presence of a fluid. For example, a cable may be placed on a computer room floor or a basement floor to detect leaks, or may be placed adjacent a pipe, such as an oil carrying pipe, to detect leaks from the pipe into the soil. Also, the application of the present invention need not be limited to liquids because the presence of various fluids including gases and vapors may possibly be detected and located if their dielectric constant is sufficiently different from that of the medium (usually air) in which the cable is disposed. Also, it may be possible to detect and locate a gas leak, e.g, an air leak, into a liquid medium. Thus, it is to be understood that, within the scope of the appended claims, the invention may be practiced otherwise than as specifically described above.

What is claimed and desired to be secured by Letters Patent of the United States is:

1. A detector for detecting fluid in a predetermined area comprising:
   an electric cable adapted to be disposed in said predetermined area;
   means for applying pulses to said cable;
   means coupled to said cable for receiving reflections of said pulses from said cable;
   means for sampling said reflections, said sampling means being operative to sample a plurality of reflections and to take only one sample of each reflection subsequent to the application of each pulse to said cable, each sample being shifted in time by a different amount with respect to the last applied pulse and corresponding to a different portion of the reflection;
   means for storing said samples to provide a stored representation of a reflection; and
   means coupled to said sampling means for comparing samples of subsequent reflections with said stored samples and providing an indication of the presence of a fluid if samples of subsequent reflections differ from said stored samples by a predetermined amount.

2. A detector as recited in claim 1 wherein said electrical cable includes first and second conductors and a fluid permeable dielectric separating said conductors.

3. A detector as recited in claim 2 wherein said dielectric includes glass fibers.

4. A detector as recited in claim 2 wherein said dielectric includes plastic fibers.

5. A detector as recited in claim 2 wherein said cable is a coaxial cable.

6. A detector as recited in claim 1 wherein said predetermined amount is less for portions of the reflection corresponding to distant portions of the cable than for portions of the reflection corresponding to near portions of the cable.

7. A detector as recited in claim 1 further including a second fluid permeable cable disposed in a second predetermined area being monitored, and means interconnecting said first and second fluid permeable cable.

8. A detector as recited in claim 7 wherein said interconnecting means includes a fluid nonpermeable cable.

9. A detector as recited in claim 1 wherein said sampling means includes means for taking multiple samples, M, of the reflected waveform.

10. A detector as recited in claim 1 wherein said comparing means includes means for determining the slope of the reflected waveform corresponding to a leak.

11. A detector as recited in claim 1 wherein said reflected waveform has an end echo and said detecting means includes means for detecting said end echo.

12. A detector as recited in claim 11 wherein said detector includes means responsive to the position of said end echo for determining the amount of cable that has been permeated by the fluid.

13. A detector for detecting fluid in a predetermined area comprising:
   an electrical cable adapted to be disposed in said predetermined area;
   means for applying pulses to said cable;
   means coupled to said cable for receiving reflections of said pulses from said cable;
   means for sampling said reflections, said sampling means being operative to take one sample of one reflection subsequent to the application of each pulse to said cable, each sample being shifted in time by a different amount with respect to the last applied pulse and corresponding to a different portion of the reflection;
   means for storing said samples to provide a stored representation of a reflection; and
   means coupled to said sampling means for comparing samples of subsequent reflections with said stored samples and providing an indication of the presence of a fluid if samples of subsequent reflections differ from said stored samples by a predetermined amount, said detector further including means for storing samples of a subsequent reflection if said samples differ from said stored samples by said predetermined amount to define a post leak waveform.

14. A detector as recited in claim 13 further including means for comparing said post leak waveform with subsequent reflections to determine the direction of flow of the fluid.

15. A detector as recited in claim 13 further including means for comparing said post leak waveform with subsequent reflections to locate a subsequent leak.

16. A detector for detecting fluid in a predetermined area comprising:
- an electrical cable adpated to be disposed in said predetermined area;
- means for applying pulses to said cable;
- means coupled to said cable for receiving reflections of said pulses from said cable;
- means for sampling said reflections, said sampling means being operative to take one sample of one reflection subsequent to the application of each pulse to said cable, each sample being shifted in time by a different amount with respect to the last applied pulse and corresponding to a different portion of the reflection;
- means for storing said samples to provide a stored representation of a reflection; and
- means coupled to said sampling means for comparing samples of subsequent reflections with said stored samples and providing an indication of the presence of a fluid if samples of subsequent reflections differ from said stored samples by a predetermined amount, wherein said sampling means includes means for taking multiple samples, M, of the reflected waveform, and wherein said M samples are spaced along the waveform by a distance corresponding to 1/M times the length of the cable.

17. A detector as recited in claim 16 wherein the reflected waveform is mapped by N samples and M is substantially less than N.

18. A detector for detecting fluid in a predetermined area comprising:
- an electrical cable adapted to be disposed in said predetermined area;
- means for applying pulses to said cable;
- means coupled to said cable for receiving reflections of said pulses from said cable;
- means for sampling said reflections, said sampling means being operative to take one sample of one reflection subsequent to the application of each pulse to said cable, each sample being shifted in time by a different amount with respect to the last applied pulse and corresponding to a different portion of the reflection;
- means for storing said samples to provide a stored representation of a reflection; and
- means coupled to said sampling means for comparing samples of subsequent reflections with said stored samples and providing an indication of the presence of a fluid if samples of subsequent reflections differ from said stored samples by a predetermined amount, wherein said sampling means includes means for taking multiple samples, M, of the reflected waveform, and wherein said M samples are spaced along the waveform by a distance corresponding to 1/PM times the length of the cable, where P is an integer.

19. A detector as recited in claim 18 wherein the reflected waveform is mapped by N samples and the product of P and M is substantially less than N.

20. A detector for detecting fluid in a predetermined area comprising:
- an electrical cable adapted to be disposed in said predetermined area;
- means for applying pulses to said cable;
- means coupled to said cable for receiving reflections of said pulses from said cable;
- means for sampling said reflections, said sampling means being operative to take one sample of one reflection subsequent to the application of each pulse to said cable, each sample being shifted in time by a different amount with respect to the last applied pulse and corresponding to a different portion of the reflection;
- means for storing said samples to provide a stored representation of a reflection; and
- means coupled to said sampling means for comparing samples of subsequent reflections with said stored samples and providing an indication of the presence of a fluid if samples of subsequent reflections differ from said stored samples by a predetermined amount, wherein said sampling means includes means for taking multiple samples, M, of the reflected waveform, and wherein said slope determining means includes means responsive to the slope for determining the identity of the fluid permeating the cable.

21. A detector for detecting fluid in a predetermined area comprising:
- a fluid permeable electrical cable adapted to be disposed in said predetermined area;
- means for applying pulses to said cable;
- means coupled to said cable for receiving reflections of said pulses from said cable;
- means for sampling said reflections, said sampling means being operative to take one sample of one reflection subsequent to the application of each pulse to said cable, each sample being shifted in time by a different amount with respect to the last applied pulse and corresponding to a different portion of the reflection;
- means for storing said samples to provide a stored representation of a reflection; and
- means for altering the width of said pulses to provide relatively narrow pulses that correspond to samples of the reflected waveform that are reflected by near portions of the cable and to provide relatively wider pulses that correspond to samples of the reflected waveforms that are reflected from more distant portions of the cable.

22. A detector as recited in claim 21 wherein said altering means includes means for counting said pulses and increasing the width of said pulses after a predetermined number of pulses have been produced.

23. A detector as recited in claim 21 wherein said reflected waveform has an end echo and said detecting means includes means for detecting said end echo.

24. A detector as recited in claim 23 wherein said altering means is responsive to the amplitude of said end echo for increasing the width of said pulses to maintain the amplitude of said end echo at a predetermined level.

25. A detector as recited in claim 23 wherein said detector includes means responsive to the position of said end echo for determining the amount of cable that has been permeated by the fluid.

26. A detector for detecting fluid in a predetermined area comprising:
- a fluid permeable electrical cable adapted to be disposed in said predetermined area;
- means for applying pulses to said cable;
- means coupled to said cable for receiving reflections of said pulses from said cable for receiving reflections of said pulses from said cable and providing a representation of the reflected waveform, said reflected waveform having an end echo;

means for storing said representation to provide a stored representation of a reflection including the position of the end echo; and means for comparing the positions of end echos of subsequent reflections with the stored position of the end echo and providing an indication of the amount of the cable that had been permeated by the fluid based on the difference between the position of the end echo of a subsequent reflection and the stored position of the end echo.

27. A detector for detecting fluid in a predetermined area comprising:

an electrical cable adapted to be disposed in said predetermined area;

means for applying a plurality of pulses to said cable; and means coupled to said cable for receiving and sampling reflections of said pulses from said cable, said receiving and sampling means being operative to sample only a portion of each reflection following the application of each pulse to said cable, said receiving and sampling means being operative to sample a different portion of the reflection following the generation of each pulse until a number of portions corresponding to an entire reflection has been sampled.

28. A detector as recited in claim 27 further including means for storing said samples to provide a stored representation of a reflection, and means for comparing said stored samples with subsequent samples to provide an indication of the presence of a fluid if subsequent samples differ from the stored sample by a predetermined amount.

29. A method for detecting the presence of a fluid in a predetermined area, comprising:

placing an electrical cable in said area;

applying pulses to said cable;

receiving reflections of said pulses from said cable; and sampling a predetermined different portion of the reflection following the application of each pulse to said cable until samples representative of an entire reflection have been obtained.

30. The method recited in claim 30 further including storing the reflection representative waveforms and comparing the stored samples with subsequent corresponding samples and indicating the presence of a fluid if a predetermined number of samples differs from the corresponding stored samples by a prodetermined amount.

31. The method recited in claim 30 wherein the particular stored samples that differ from the corresponding stored samples by the predetermined amount are determined to provide an indication of the location of the fluid within the predetermined area.

* * * * *